3,337,910
BOTTLE FORMING APPARATUS
Walter H. West, Bay City, Mich., assignor to The Dow Chemical Company, Midland, Mich., a corporation of Delaware
Filed Jan. 14, 1963, Ser. No. 251,440
1 Claim. (Cl. 18—5)

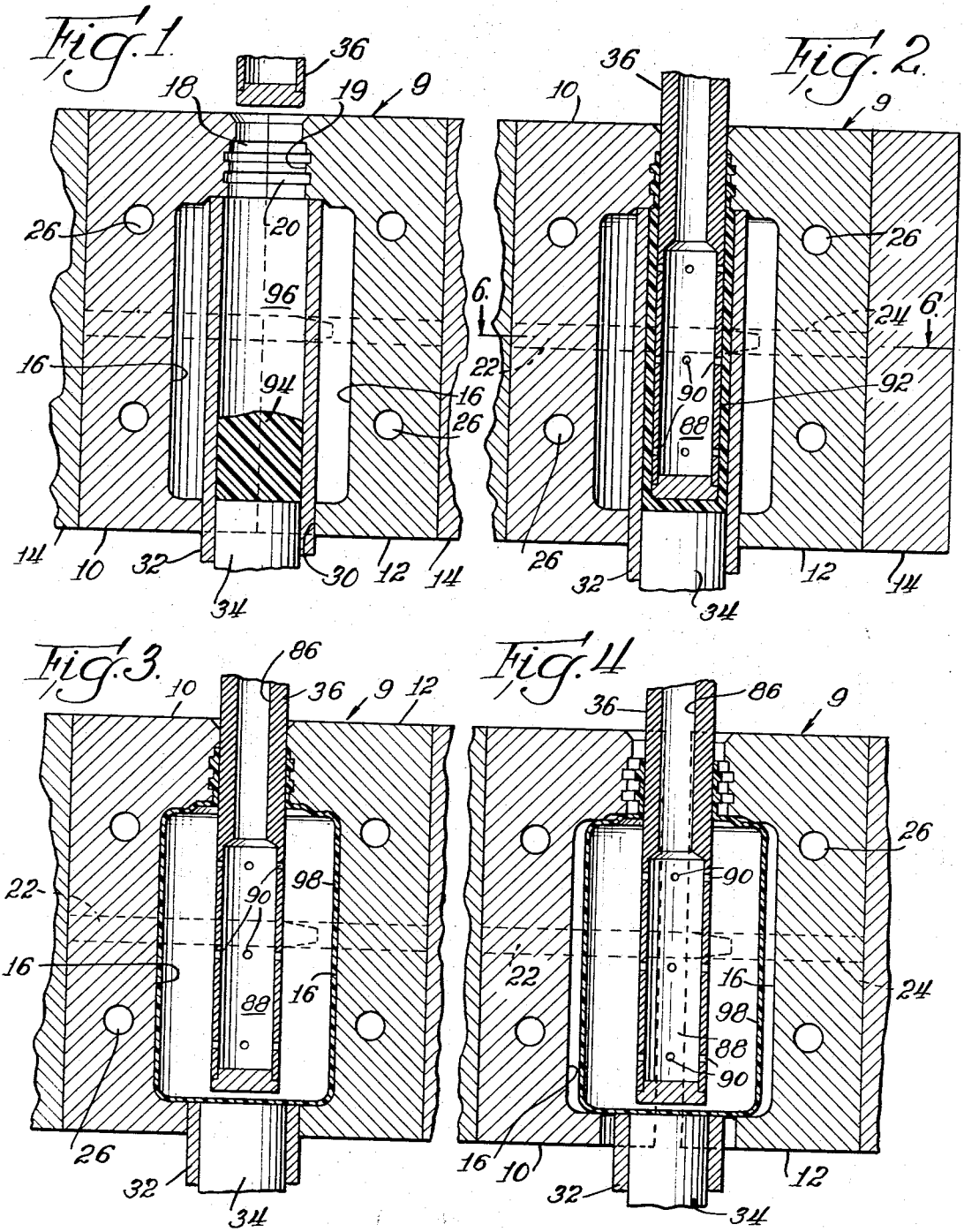

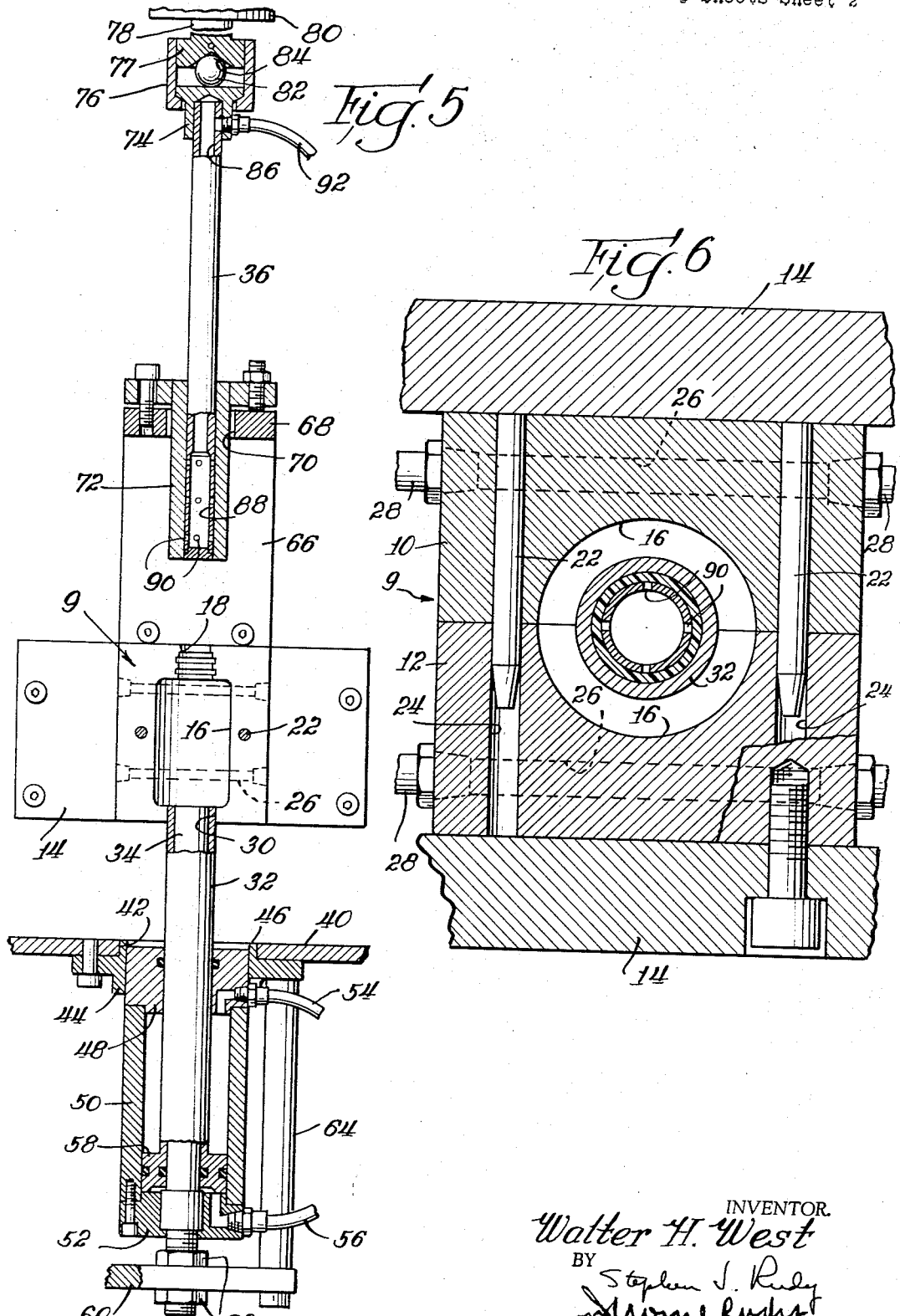

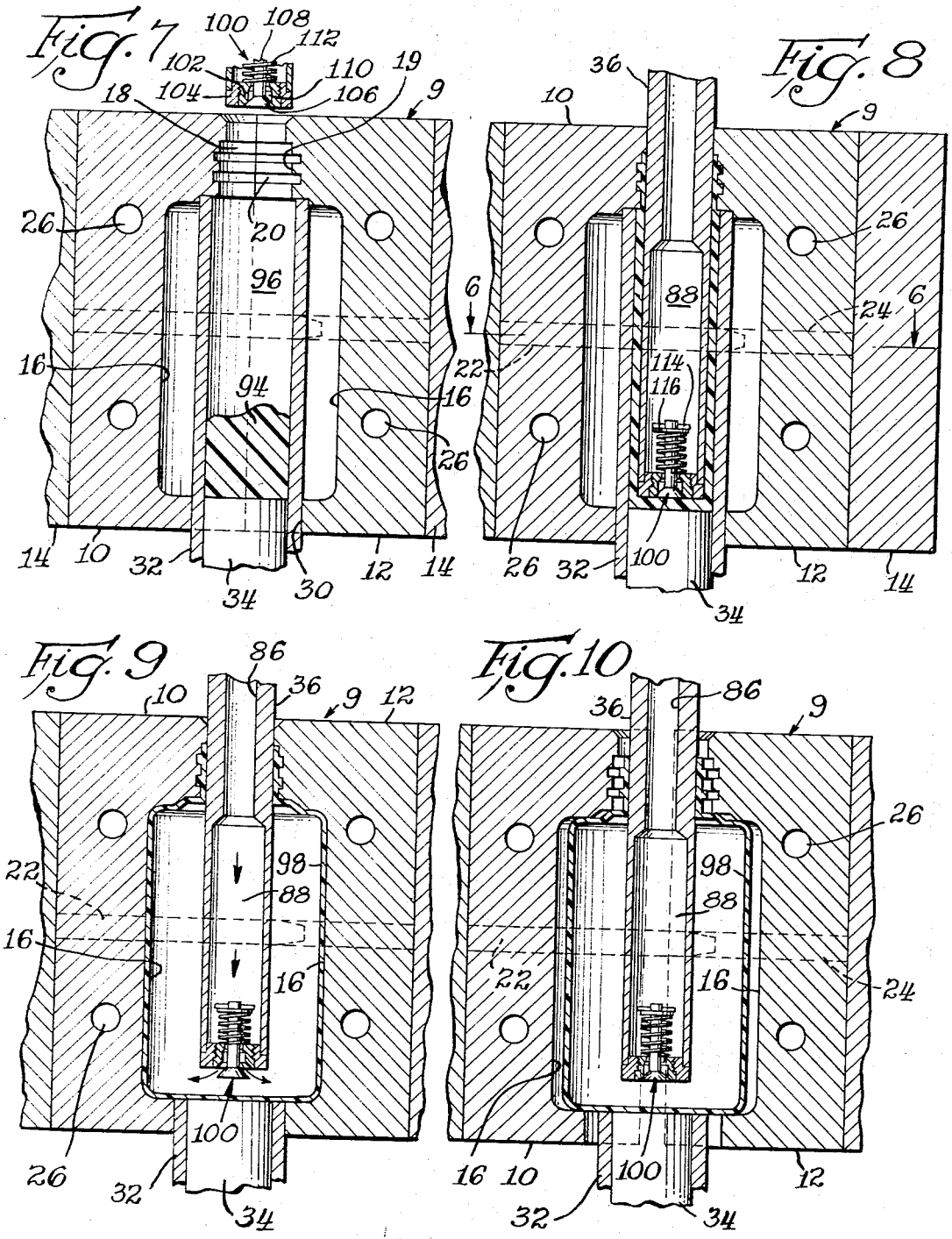

This invention relates to an apparatus representing an improvement in the art of blow molding plastic bottles.

This application is a continuation-in-part of my application Ser. No. 173,268, filed Feb. 14, 1962, and now abandoned.

Many apparatus have been proposed and utilized for blow molding plastic bottles, with varying degrees of success. Among the more important objectives, is the production of a bottle having good dimensional tolerances, and which will be in substantially finished condition, i.e., require little or no trimming operations, upon being removed from the molding die.

The apparatus of the present invention is believed to represent an important advance in the art of producing a blow molded plastic bottle having good dimensional tolerance, and which is in finished form upon being removed from the molding die. The apparatus is especially effective in producing well formed grooves, or threads, upon a bottle neck portion, whereby a cover or cap may be removably affixed thereto.

Briefly, the apparatus of the invention includes a plunger which compresses a predetermined amount of flowable plastic material into a preform in the shape of a tubular element having a threaded portion on the open upper end, and a closed bottom on the other end. The preform, with exception of the threaded neck portion, is expanded by compressed air into engagement with the wall of a split type molding die, following which the blown bottle is removed from the molding die in finished condition. A high quality bottle is thus produced in a very economical manner, since material wastage is eliminated, and extra finishing costs are avoided.

The main object of the invention is to provide an apparatus representing an improvement in the art of blow molding plastic bottles.

A more specific object is to provide an apparatus for blow molding plastic bottles having good dimensional tolerance, and which require no subsequent finishing operations after being molded.

Another object is to provide an apparatus for blow molding bottles having grooved, or threaded neck portions.

A further object is to provide an apparatus for blow molding plastic bottles in an economical manner.

These and further objects and features of the invention will become more apparent from the following description and accompanying drawing wherein:

FIGS. 1 to 4 are vertical section views taken through a mold assemblage incorporating the principles of the invention, and showing successive stages in the operation thereof;

FIG. 5 is an elevation view, mostly in cross section, illustrating the overall apparatus used in the practice of the invention;

FIG. 6 is a cross section view (slightly enlarged generally as seen along line 6—6 in FIG. 2, but rotated 90° from the position shown in FIG. 2; and FIGS. 7 to 10 are vertical section views taken through a modified mold assemblage incorporating the principles of the invention, and showing successive stages in the operation thereof.

Referring now to the drawings and more particularly to FIGS. 1 to 4, numeral 9 identifies a molding die assemblage including a pair of symmetrically formed mold halves 10, 12, which are supported for relative horizontal movement by a pair of die plates 14. Means (not shown) are arranged for providing such relative horizontal movement to the die plates. The mold halves are adapted to have a semicircular cavity, a major portion 16 of which defines the side wall of a bottle, or receptacle, while an upper portion 18 is formed to provide an opening 19 defining and integral neck portion. The walls of the opening 19 may have some form of groove arrangement, or screw threads 20, to mold complementary threads upon a bottle formed in the mold for affixing a cover means thereto. A mold alignment means includes a pair of dowel pins 22, which are positioned in the die half 10 to project into a pair of passageways, or holes 24 formed in the die half 12. Passageway means 26 are formed in the die halves for circulation of a cooling medium therein, as conducted by appropriate hose means 28 (FIG. 6).

The bottom portion of the mold halves are formed to provide a round hole, or opening 30, which is in axial alignment with the opening 19, and which is adapted to slidingly receive an end of a hollow piston rod 32 mounted for reciprocal movement upon an adjusting rod 34. The opening 19 is adapted to slidingly receive a cylindrical plunger 36, said opening having a minimum diameter which is slightly larger than the maximum diameter of the plunger.

As best seen in FIG. 5, a horizontally arranged base plate 40 is positioned below the mold assemblage 9, said plate having a hole 42, in axial alignment with the opening 30 of the mold assemblage. An adapter ring 44, secured to the base plate 40, has a circular shoulder 46, which fits within the hole 42 of the base plate. Positioned within the adapter ring is a gland bushing 48 arranged to slidingly receive the piston rod 32. A cylinder 50, secured at one end to the bushing 48, has a cap 52 affixed to the lower end thereof. A hose means 54 is connected to the bushing 48, while a hose means 56 is connected to the cap 52, said hose means being adapted for passage of pressurized medium, i.e., compressed air, into or out of either end of the cylinder 50. The piston rod 32 has a piston head 58 on the lower end, which is arranged for sliding engagement within the cylinder 50.

The lower extremity of the adjusting rod 34 is threaded and adjustably secured to a tie bar 60 by a pair of adjusting nuts 62 placed one on each side of the tie bar. The ends of the tie bar are secured to hanger bars 64, the upper ends of which are affixed to the adapter ring 44. The upper extremity of the adjusting rod 34 is arranged to be in alignment with the lower bottom edge of the cavities 16.

A pair of guide support brackets 66 are arranged in parallel vertical manner above the mold assemblage 9, the upper ends of the brackets having a horizontally arranged guide support piece 68 affixed thereto, which support piece has a hole 70 arranged in axial alignment with the opening 19. Secured to the support piece 68, and extending through the hole 70, is a guide piece 72 which slidingly supports the plunger 36 for vertical movement.

The plunger 36 is secured at its upper end to an end cap 74, which is supported in a retainer 76. The latter is affixed to an enlarged end 77 of a piston rod 78, which is reciprocably mounted in a cylinder 80, the lower end portion of which is shown. A ball 82, which fits in a conical recess 84 formed in the enlarged end 77, is arranged to seat upon the end cap 74, and serves to transmit compressive force to the plunger 36, without development of side thrust. Plunger 36 has an axial passageway 86, which connects with a cylindrical chamber 88. A plurality of holes 90 extend radially through the walls of the chamber 88. A hose means 91 is connected to the end cap 74 whereby pressurized medium, such as compressed air, may be admitted to the passageway 86. As best seen in FIG. 2, the outside diameter of the plunger 36 is less than the inner diameter of the piston rod 32, thus forming a uniform wall thickness tubular space 92 therebetween.

The foregoing completes the description of the primary components used in an assemblage for the practice of the invention as illustrated in FIGS. 1 to 6. It will be understood that additional components, such as means for providing regulated closing and opening of the mold halves 10 and 12, pressurized fluid supply means, flow control valves, limit switches, electrical circuitry, etc., will be required. However, anyone skilled in the art should have little difficulty in providing such equipment as needed for the proper performance of the overall assemblage.

A molding cycle, using the apparatus of the invention as illustrated in FIGS. 1 to 6, will now be described.

Assume that the relative position of various parts is as shown in FIG. 1. It will be seen that the die mold halves 10 and 12 are in closed position, and that the hollow piston rod 32 is in elevated positon within the mold cavity 16, so that the upper end abuts the wall of the mold cavity. Flowable plastic material 94 is placed in a cylindrical chamber 96, defined by the inner walls of the piston 32 and the upper end of the adjusting rod 34.

No specific mention has been made of the type of plastic material useable in the practice of the method of the invention, however, it is to be understood that any organic material having the necessary degree of elasticity, and adapted to be used for blow molding plastic bottles, such as normally solid polyolefins, particularly polyethylene, polypropylene, copolymers of ethylene and propylene and the like, polystyrene and similar alkenyl aromatic resins and rubber modified variations thereof, vinyl chloride polymers, nylon and so forth, may be satisfactory.

The plunger 36 is then moved downwardly within the chamber 96, until the lower end of the plunger is at a given distance from the end of the adjusting rod, as shown in FIG. 2. Such downward movement of the plunger forces the plastic material 94 upwardly in the cylindrical space 92 and into the neck portion 18, to make a preform in the shape of a tube-like element having a closed bottom. The amount of plastic material placed in the chamber 96, is carefully metered so as to cause some degree of compression thereof upon full downward stroke of the plunger 36, whereby the cylindrical space 92 and neck portion grooves 20 anre completely filled.

The piston rod 32 is next lowered so that the upper edge is even with the upper end of the adjusting rod 34. Compressed air is then admitted to the chamber 88, causing an expansion of the plastic material into engagement with the wall 16 of the mold cavities, as best seen in FIG. 3.

After the molding operation is completed, the mold halves 10 and 12 are opened, and a formed bottle 98 is removed from the mold assemblage. The plunger 36 may advantageously be mover upwardly out of the bottle 98, before the mold halves are opened.

A modified form of the present invention is illustrated in FIGS. 7 to 10. The structure and operation of the mold halves 10 and 12 and their related components are substantially similar to those previously disclosed in FIGS. 1 to 4, and like portions bear like reference characters.

The change incorporated in FIGS. 7 to 10 is the use of a poppet-type valve 100 whereby pressurized medium, such as compressed air, can be admitted to the chamber 88, when the valve is opened, resulting in an expansion of the plastic material into engagement with the wall 16 of the wall cavities, in a similar manner as that previously described with respect to FIGS. 1 to 4 where holes 90 were employed.

Valve 100 is held within a housing 102 which is threadedly engaged within end cap 104 of plunger 36. Adjacent a portion of the inclined head 106 and stem 108 of valve 100 is a cavity 110 which permits the pressurized medium to escape from the end of plunger 36 when the valve is open. Valve 100 is held within housing 102 by means of spring element 112 which is of such a strength that it normally will keep the valve 100 in a closed position except when a pressurized medium is introduced into plunger 36. A pin 114 passing through stem 108 secures the spring 112 in an engaged position against the valve through shoulder ring 116.

FIG. 7 is similar to FIG. 1 with the mold halves 10 and 12 in a closed position, the hollow piston rod 32 and the plunger 36 in an elevated position, and with the flowable plastic material 94 located within chamber 96.

FIG. 8 is similar to FIG. 2 and illustrates the plunger 36 in its downwardly extended position whereby plastic material is displaced upwardly in the cylindrical space 92 and into the neck portion to make a preform. In this position valve 100 remains closed, not only due to biasing of spring 112, but also by the force of the plastic working against the bottom 104 of plunger 36.

FIG. 9 is similar to FIG. 3 with the exception that plunger 36 is raised some distance above the bottom of the preform to permit clearance of the valve 100 as it is opened to permit the pressurized medium, i.e. compressed air, to be emitted to the chamber 88 to cause expansion of the plastic preform into engagement with the wall 16 of the wall cavity.

With the molding operation completed, FIG. 10, which is similar to FIG. 4, shows that the mold halves 10 and 12 are opened, and that the formed bottle 98 is ready for removal from the mold assemblage.

It will be seen that a bottle made by the molding procedures above described, will be in final form upon being taken from the mold, i.e., no other finishing operations will normally be required. In short, it will be apparent that a bottle made in accordance with the principles of the invention will satisfy the objectives set forth hereinbefore.

The foregoing description has been given in detail without thought of limitation since the inventive principles involved are capable of assuming other forms without departing from the spirit of the invention or the scope of the following claim.

What is claimed is:

Apparatus for blow molding a plastic bottle including, a split-type die mold having a top which is shaped to define a neck portion for said bottle, a cylindrical chamber movable axially through the bottom of said die mold and capable of receiving and retaining flowable plastic, a plunger of smaller dimension than said chamber movable into said chamber axially through the top of said die mold, whereby flowable plastic in said chamber will be compressed and forced about said plunger into a tubular element having a closed bottom, means to remove said chamber from said die mold, and means associated with said plunger to expand said formed tubular element remaining about said plunger to conform to the walls of said split-type die mold whereby a bottle may be formed.

References Cited

UNITED STATES PATENTS

| | | | |
|---|---|---|---|
| 688,924 | 12/1901 | Blair et al. | 18—5 |
| 2,317,763 | 4/1943 | Hall | 18—5 |
| 2,408,630 | 10/1946 | Green | 264—323 |
| 2,469,130 | 5/1949 | Rodman | 264—97 |

FOREIGN PATENTS 937,078   12/1955   Germany.

ROBERT F. WHITE, *Primary Examiner.*

M. H. ROSEN, A. R. NOË, *Assistant Examiners.*